United States Patent
Sayyadi et al.

(10) Patent No.: US 10,971,160 B2
(45) Date of Patent: Apr. 6, 2021

(54) METHODS AND SYSTEMS FOR DETERMINING A WAKE WORD

(71) Applicant: Comcast Cable Communications, LLC, Philadelphia, PA (US)

(72) Inventors: Hans Sayyadi, Arlington, VA (US); Nima Bina, Washington, DC (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 20 days.

(21) Appl. No.: 16/189,937

(22) Filed: Nov. 13, 2018

(65) Prior Publication Data
US 2020/0152205 A1    May 14, 2020

(51) Int. Cl.
| | |
|---|---|
| G10L 15/00 | (2013.01) |
| G10L 17/06 | (2013.01) |
| G10L 15/07 | (2013.01) |
| G10L 15/22 | (2006.01) |
| G10L 25/90 | (2013.01) |

(52) U.S. Cl.
CPC .............. *G10L 17/06* (2013.01); *G10L 15/07* (2013.01); *G10L 15/22* (2013.01); *G10L 25/90* (2013.01); *G10L 2015/223* (2013.01)

(58) Field of Classification Search
CPC ... G10L 15/22; G10L 2015/223; G10L 15/26; G10L 15/265; G10L 15/30; G10L 15/08; G10L 15/00; G10L 17/005; G06F 3/167; G06F 3/0482; G06F 3/16
See application file for complete search history.

(56) References Cited

U.S. PATENT DOCUMENTS

| | | | |
|---|---|---|---|
| 7,590,536 B2 * | 9/2009 | Bates | G10L 15/197 704/231 |
| 8,359,020 B2 * | 1/2013 | Lebeau | H04M 1/72569 455/420 |
| 8,738,925 B1 * | 5/2014 | Park | H04W 56/001 713/186 |
| 9,189,196 B2 * | 11/2015 | Doherty | G08C 17/02 |

(Continued)

FOREIGN PATENT DOCUMENTS

| | | |
|---|---|---|
| CA | 3061533 | 11/2019 |
| EP | 19208983.7 | 11/2018 |

(Continued)

OTHER PUBLICATIONS

European Search Report and Written Opinion dated Mar. 2, 2020 by the European Patent Office for EP Application No. 19208983.7, filed on Nov. 13, 2018 and published as EP 3654330 on May 20, 2020 (Applicant—Comcast Cable Communications, LLC.) (10 Pages).

*Primary Examiner* — Edgar X Guerra-Erazo
(74) *Attorney, Agent, or Firm* — Ballard Spahr LLP

(57) ABSTRACT

A user device (e.g., voice assistant device, voice enabled device, smart device, computing device, etc.) may receive/detect audio content (e.g., speech, etc.) that includes a wake word and/or words similar to a wake word. The user device may require a wake word, a portion of the wake word, or words similar to the wake word to be detected prior to interacting with a user. The user device may, based on characteristics of the audio content, determine if the audio content originates from an authorized user. The user device may decrease and/or increase scrutiny applied to wake word detection based on whether audio content originates from an authorized user.

28 Claims, 6 Drawing Sheets

(56) References Cited

U.S. PATENT DOCUMENTS

| | | | |
|---|---|---|---|
| 9,445,209 B2 | 9/2016 | Dadu et al. | |
| 9,484,030 B1* | 11/2016 | Meaney | H04R 3/005 |
| 9,589,560 B1 | 3/2017 | Vitaladevuni et al. | |
| 9,728,188 B1 | 8/2017 | Rosen et al. | |
| 10,134,399 B2* | 11/2018 | Lang | G10L 17/22 |
| 10,331,399 B2* | 6/2019 | Alsina | G06F 3/162 |
| 2006/0004834 A1* | 1/2006 | Pyhalammi | H04N 21/47205 |
| 2007/0216764 A1* | 9/2007 | Kwak | G07C 9/00309 |
| | | | 348/14.06 |
| 2010/0070922 A1* | 3/2010 | DeMaio | G06F 3/0488 |
| | | | 715/811 |
| 2013/0278492 A1* | 10/2013 | Stolarz | G06F 3/01 |
| | | | 345/156 |
| 2013/0311997 A1* | 11/2013 | Gruber | G06F 9/4843 |
| | | | 718/102 |
| 2014/0100848 A1* | 4/2014 | Shaffer | G10L 15/22 |
| | | | 704/240 |
| 2014/0278435 A1 | 9/2014 | Ganong, III et al. | |
| 2015/0128065 A1* | 5/2015 | Torii | G06F 3/1454 |
| | | | 715/746 |
| 2015/0170643 A1* | 6/2015 | Nicholson | G10L 15/22 |
| | | | 704/254 |
| 2016/0077794 A1 | 3/2016 | Kim et al. | |
| 2016/0125879 A1* | 5/2016 | Lovitt | G10L 17/00 |
| | | | 704/275 |
| 2016/0127780 A1* | 5/2016 | Roberts | H04N 21/472 |
| | | | 725/44 |
| 2016/0248768 A1* | 8/2016 | McLaren | H04L 63/0861 |
| 2016/0262017 A1* | 9/2016 | Lavee | G06F 21/316 |
| 2017/0032784 A1 | 2/2017 | Dadu et al. | |
| 2017/0193996 A1 | 7/2017 | Zurek et al. | |
| 2017/0357478 A1* | 12/2017 | Piersol | G10L 15/30 |
| 2018/0074785 A1* | 3/2018 | Ohmura | G06F 3/0487 |
| 2019/0088261 A1* | 3/2019 | Lang | G06F 3/165 |

FOREIGN PATENT DOCUMENTS

| | | | | |
|---|---|---|---|---|
| WO | WO 2015/196063 | * | 12/2015 | G10L 15/28 |
| WO | WO-2017/217978 A1 | | 12/2017 | |

* cited by examiner

METHODS AND SYSTEMS FOR DETERMINING A WAKE WORD

BACKGROUND

Homes and offices are becoming more connected with the proliferation of user devices, such as voice enabled smart devices. Users are able to interact with such user devices through natural language input such as speech. Typically, such user devices require a wake word in order to begin interacting with a user. The use of speech to interact with such user devices presents many challenges. One challenge concerns ensuring that the speech is intended to be a wake word. Another challenge is ensuring that speech that includes a wake word is recognized as originating from an authorized user, rather than from an unauthorized user or audio source (e.g., a television).

SUMMARY

It is to be understood that both the following general description and the following detailed description are exemplary and explanatory only and are not restrictive. Methods and systems for determining a wake word are described.

A wake word (or wake phrase) detected by a user device (e.g., voice assistant device, voice enabled device, smart device, computing device, etc.) may cause the user device to interact with a user (e.g., detect and/or process user commands and/or operational instructions, etc.). The user device may require that a wake word be received/detected prior to any interactions. The user device may detect speech and identify a potential wake word in the detected speech. The user device may assign a confidence score indicative of the accuracy of the detection of the wake word (e.g., did the user device detect the actual wake word, a different word, background noise, etc.). The user device may compare the confidence score to a threshold (e.g., a wake word detection threshold, etc.) to determine whether to accept the wake word or not. The user device may modify the threshold based on whether the user device recognizes the speech as originating from an authorized user. The user device may generate a voiceprint (e.g., one or more measurable characteristics of a human voice that uniquely identifies an individual, etc.) of the detected speech and compare the voiceprint to a stored voiceprint known to originate from an authorized user. Upon determining that the voiceprints match, and therefore that the speech originates from an authorized user, the user device may lower the threshold used to determine if the wake word was detected. Upon determining that the voiceprints do not match, and therefore that the speech did not originate from an authorized user, the user device may raise the threshold used to determine if the wake word was detected. The user device may thus decrease or increase the scrutiny applied to wake word detection based on whether the speech containing the wake word originates from an authorized user.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, show examples and together with the description, serve to explain the principles of the methods and systems.

DETAILED DESCRIPTION

Figure 1:
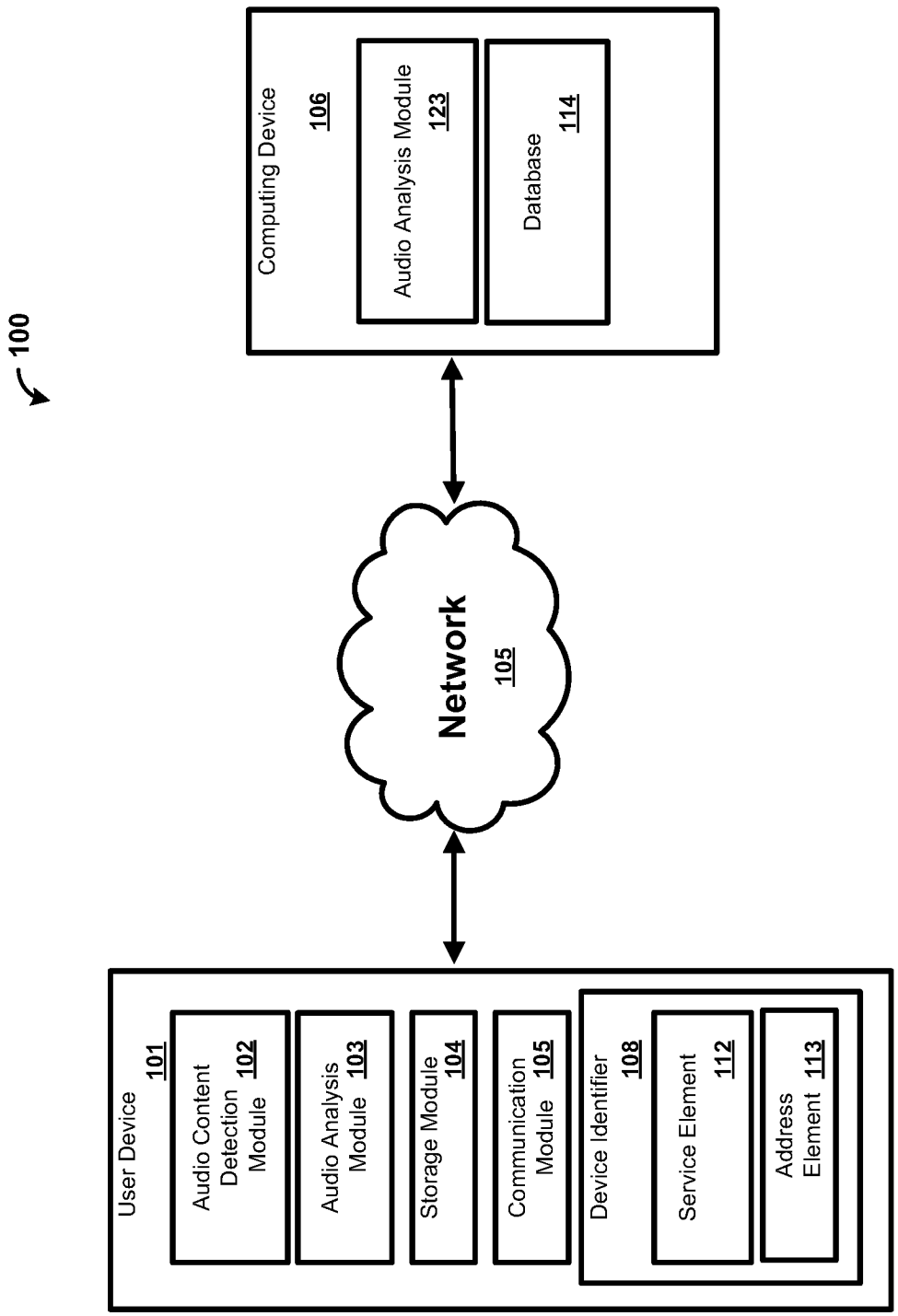
FIG. 1 shows a system for determining a wake word.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0, 1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

The term "wake word" may refer to and/or include a "wake word," a "wake phrase," a "processing word," a "processing phrase," a "confirmation word," a "confirmation phrase," and/or the like, and are considered interchangeable, related, and/or the same.

Phrases used herein, such as "accessing" content, "providing" content, "viewing" content, "listening" to content, "rendering" content, "playing" content, "consuming" content, and the like are considered interchangeable, related, and/or the same. In some cases, the particular term utilized may be dependent on the context in which it is used. Accessing video may also be referred to as viewing or playing the video. Accessing audio may also be referred to as listening to or playing the audio.

This detailed description may refer to a given entity performing some action. It should be understood that this language may in some cases mean that a system (e.g., a computer) owned and/or controlled by the given entity is actually performing the action.

A wake word (or wake phrase) detected by a user device (e.g., voice assistant device, voice enabled device, smart device, computing device, etc.) may cause the user device to interact with a user (e.g., detect and/or process user commands and/or operational instructions, etc.). A wake word (or wake phrase) detected by a user device (e.g., voice assistant device, voice enabled device, smart device, computing device, etc.) may cause the user device to process content/information, confirm content/information, and/or the like.

The user device may require that a wake word be received/detected prior to any interactions. The user device may determine whether a wake word is received/detected (e.g., whether to accept a potential wake word, etc.) or not based on a threshold (e.g., a wake word detection threshold, etc.). The user device may detect audio content (e.g., speech, etc.) and detect/identify a potential wake word from the audio content. The audio content may include and/or be associated with the wake word (or wake phrase), and/or include one or more words that are similar to the wake word (or wake phrase). A wake word (or wake phrase) may be, "hey device," and audio content may include one or more words that are similar to the wake word (or wake phrase), such as, "hey, devices are usually sold here." The user device may assign a confidence score indicative of the accuracy of the detection of the wake word (e.g., did the user device detect an actual wake word/phrase, a different/similar word/phrase, background noise, etc.). The user device may compare the confidence score to the threshold (e.g., a wake word detection threshold, etc.) to determine whether to accept one or more words included with audio content as a wake word (or wake phrase) or not. The user device may modify the threshold based on whether the user device recognizes the audio content as originating from an authorized user. An authorized user may include a person registered to operate the user device (e.g., based on a user profile, etc.), a person that has permission to use the user device, a user associated with the user device, and/or the like. If audio content originates from an authorized user, the threshold may be low and/or lowered. If audio content does not originate from an authorized user, such as audio content that originates from an unauthorized user (e.g., a non-authorized user, a user not associated with an authorized user, etc.), a device (e.g., a television, a radio, a computing device, etc.), or the like, the threshold may be high and/or raised.

To determine whether audio content (e.g., speech, etc.) originates from an authorized user, the user device may generate, based on the audio content, a voiceprint (e.g., one or more measurable characteristics of a human voice that uniquely identifies an individual, etc.). To generate the voiceprint, the user device may determine audio characteristics of the audio content. Audio characteristics may be and/or include a frequency, a duration, a decibel level, an amplitude, a tone, an inflection, an audio rate, an audio volume, and/or any such characteristic associated with the audio content. The voiceprint may be a collection and/or combination of the audio characteristics. The user device may compare the voiceprint to a stored voiceprint known to originate from an authorized user. If the voiceprint matches and/or corresponds to a stored voiceprint, the user device may determine that the audio content associated with the voiceprint originates from an authorized user. The user device, based on determining that audio content originates from an authorized user, may lower the threshold (e.g., the wake word detection threshold, etc.) used to determine whether the wake word was detected. If the voiceprint does not match and/or correspond to a stored voiceprint, the user device may determine that the audio content associated with the voiceprint did not originate from an authorized user (e.g., audio content that originates from an unknown, non-authorized, and/or unauthorized user, etc.). The user device, based on determining that the audio content associated with the voiceprint did not originate from an authorized user, may raise the threshold used to determine whether the wake word was detected.

A low threshold (e.g., wake word detection threshold, etc.) may cause the user device to interact with a user (e.g., detect and/or process user commands and/or operational instructions, etc.) if the audio content includes either a wake word (or wake phrase), or one or more words that are similar to the wake word (or wake phrase). The user device may, based on determining that audio content originates from an authorized user, may interact with a user if the audio content includes a wake word (or wake phrase), such as, "hey device." When audio content is associated with an authorized user, the user device may interact with the authorized user if the audio content includes the wake word (or wake phrase) "hey device," or includes one or more words that are similar to the wake word (or wake phrase) such as, "hey, devices are usually sold here," "hey, Diana," "having divided," and/or any other one or more words that may be ambiguously associated with the wake word (or wake phrase).

A high threshold (e.g., wake word detection threshold, etc.) may cause the user device to interact with a user (e.g., detect and/or process user commands and/or operational instructions, etc.) only if the audio content includes a wake word (or wake phrase). The user device may, based on determining that audio content is not associated with an authorized user, such as audio content associated with an unauthorized user (e.g., a non-authorized user, a user not associated with an authorized user, etc.), a device (e.g., a television, a radio, a computing device, etc.), or the like, may require that the audio content include a wake word (or wake phrase) prior to interacting with a user. The user device may, based on determining that audio content is not associated with an authorized user, may require that audio content include a wake word (or wake phrase), such as "hey device," prior to interacting with a user. The user device may not interact with a user, and/or remain in an unawakened state (e.g., standby, hibernate, etc.), based on determining that audio content is not associated with an authorized user. A high threshold may cause the user device to not interact with a user, and/or remain in an unawakened state (e.g., standby, hibernate, etc.), even if the audio content includes a wake word (or wake phrase).

The user device, by raising and lowering the threshold (e.g., the wake word detection threshold, etc.) based on whether audio content originates from an authorized user, may decrease or increase scrutiny applied to wake word detection.

FIG. 1 shows a system 100 for determining a wake word. A wake word (or wake phrase) may cause a user device (e.g., user device 101, etc.) to interact with a user (e.g., detect and/or process user commands and/or operational instructions, etc.). A wake word (or wake phrase) may cause a user device to process content/information, confirm content/information, and/or the like.

The system 100 may comprise a user device 101 (e.g., a voice assistant device, a voice enabled device, a smart device, a computing device, etc.). The user device 101 may be in communication with a network such as a network 105. The network 105 may be a network such as the Internet, a wide area network, a local area network, a cellular network, a satellite network, and the like. Various forms of communications may occur via the network 105. The network 105 may comprise wired and wireless telecommunication channels, and wired and wireless communication techniques.

The user device 101 may be associated with a device identifier 108. The device identifier 108 may be any identifier, token, character, string, or the like, for differentiating one user device (e.g., the user device 101, etc.) from another user device. The device identifier 108 may identify user device 101 as belonging to a particular class of user devices. The device identifier 108 may include information relating to the user device 101 such as a manufacturer, a model or type of device, a service provider associated with the user device 101, a state of the user device 101, a locator, and/or a label or classifier. Other information may be represented by the device identifier 108.

The device identifier 108 may have an address element 113 and a service element 112. The address element 113 may have or provide an internet protocol address, a network address, a media access control (MAC) address, an Internet address, or the like. The address element 113 may be relied upon to establish a communication session between the user device 101, a computing device 106, or other devices and/or networks. The address element 113 may be used as an identifier or locator of the user device 101. The address element 113 may be persistent for a particular network (e.g., network 105, etc.).

The service element 112 may identify a service provider associated with the user device 101 and/or with the class of the user device 101. The class of the user device 101 may be related to a type of device, capability of device, type of service being provided, and/or a level of service (e.g., business class, service tier, service package, etc.). The service element 112 may have information relating to or provided by a communication service provider (e.g., Internet service provider) that is providing or enabling data flow such as communication services to the user device 101. The service element 112 may have information relating to a preferred service provider for one or more particular services relating to the user device 101. The address element 113 may be used to identify or retrieve data from the service element 112, or vice versa. One or more of the address element 113 and the service element 112 may be stored remotely from the user device 101 and retrieved by one or more devices such as the user device 101, the computing device 106, or any other device. Other information may be represented by the service element 112.

The user device 101 may have an audio content detection module 102 for detecting audio content. The audio content detection module 102 may detect and/or receive audio content originating from a user speaking in proximity to the user device 101 and/or the like. The audio content detection module 102 may include one or more microphones, or the like that, detect/receive the audio content. The audio content may have and/or be associated with a wake word (or wake phrase). The audio content may be content (e.g., speech, etc.) that originates from and/or is caused by a user (e.g., an authorized user, an unauthorized user, etc.), a device (e.g., a television, a radio, a computing device, etc.). The audio content may include and/or be associated with the wake word (or wake phrase), and/or include one or more words that are similar to the wake word (or wake phrase). A wake word (or wake phrase) may be, "hey device." The audio content may include the wake word or may include one or more words that are similar to the wake word (or wake phrase), such as, "hey, devices are usually sold here." The audio content detection module 102 may provide the audio content (e.g., a signal indicative of the audio content) to an audio analysis module 103. The user device 101 may use the audio analysis module 103 to determine the wake word (or wake phrase) and/or one or more words that are similar to the wake word (or wake phrase).

The audio analysis module 103 may determine, based on the audio content, a wake word (or wake phrase) and/or one or more words that are similar to the wake word (or wake phrase). The audio analysis module 103 may determine the wake word (or wake phrase) and/or one or more words that are similar to the wake word (or wake phrase) by performing speech-to-text operations that translate audio content (e.g., speech, etc.) to text, other characters, or commands. The audio analysis module 103 may apply one or more voice recognition algorithms to the audio content (e.g., speech, etc.) to extract a word and/or words. The audio analysis module 103 may convert the extracted word or words to text and compare the text to a stored word and/or stored words (e.g., stored in the storage module 104, etc.), such as a wake word (or wake phrase). A wake word (or wake phrase) and/or one or more words that are similar to the wake word (or wake phrase), such as wake word synonyms that share a phonetic relationship, and the like, may be stored (e.g., stored in the storage module 104, etc.), such as during a device (user device) registration process, when a user profile associated with a user device is generated, and/or any other suitable/related method.

The audio analysis module 103 may determine whether a word and/or words extracted/determined from the audio content match a stored wake word (or wake phrase), or are related to a stored wake word (or wake phrase). The audio analysis module 103 may determine whether audio content includes a wake word (or wake phrase) (e.g., did the user device 101 detect an actual wake word (or wake phrase), such as "hey device," etc.), or one or more words related to the wake word (or wake phrase) (e.g., did the user device 101 detect a different/similar word/phrase related to the wake word (or wake phrase), such as, "hey, devices are usually sold here," "hey, Diana," "having divided," etc.).

The audio analysis module 103 may assign a confidence score indicative of the accuracy of whether a wake word (or wake phrase) is determined from audio content. A confidence score may be based on a scale, such as from a value of one (1) to ten (10), where scale values correspond to an accuracy of wake word detection. A confidence score may be based on any scale and/or value. The audio analysis module 103 may determine that the audio content includes one or more words, such as "hey device," that match a stored wake word (or wake phrase) "hey device," associated with the user device 101. The audio analysis module 103 may assign a confidence score of ten (10) which indicates that the wake word (or wake phrase) determined from the audio content matches (e.g., approximately 100 percent accuracy, etc.) a stored wake word (or wake phrase).

The audio analysis module 103 may determine that audio content includes one or more words that are similar to a stored wake word (or wake phrase) "hey device," such as, "hey, devices are usually sold here," "hey, Diana," "having divided," and/or any other one or more words that may be ambiguously associated with the stored wake word (or wake phrase). The audio analysis module 103 may assign a confidence score of eight (8) to one or more words that are similar to the stored wake word (or wake phrase) "hey device," such as, "hey, devices are usually sold here," which indicates that the one or more words determined from the audio content are a close (e.g., similar, a partial match, less than percent accuracy, etc.) to the stored wake word (or wake phrase) match. The audio analysis module 103 may assign a confidence score of two (2) to one or more words that are similar to the stored wake word (or wake phrase) "hey device," such as, "hey, do you want tacos tonight," which indicates that the one or more words determined from the audio content are weakly related (e.g., somewhat similar, a partial match, less than percent accuracy, etc.) to the stored wake word. The audio analysis module 103 may assign any confidence score indicative of the accuracy of a possible wake word (or wake phrase) determined from audio content.

The audio analysis module 103 may compare a confidence score to a threshold (e.g., a wake word detection threshold, etc.) to determine whether to accept one or more words included with audio content as a wake word (or wake phrase) or not. The audio analysis module 103 may determine to accept the one or more words included with the audio content as the wake word (or wake phrase) when the confidence score is equal to and/or satisfies the threshold, and may determine not to accept the one or more words as the wake word (or wake phrase) when the confidence score does not satisfy the threshold. The threshold may be a value, such as a threshold value of six (6). Audio content that includes one or more words that are similar to a stored wake word (or wake phrase) "hey device," such as "hey, devices are usually sold here," may be assigned a confidence score of eight (8). The audio content including the one or more words that are similar to the stored wake word (or wake phrase) may satisfy the threshold because the assigned confidence score of eight (8) is greater than the threshold value of six (6). The threshold may be any value. The threshold may be satisfied by a confidence score that is equal to, or greater than, the threshold value. A confidence score that is less than the threshold value may not satisfy the threshold. The audio analysis module 103 may modify the threshold based on whether the user device 101 (e.g., the audio analysis module 103, etc.) determines that the audio content originates from an authorized user.

When audio content originates from an authorized user, the threshold (e.g., a wake word detection threshold, etc.) may be low and/or lowered. When audio content does not originate from an authorized user, such as audio content that originates from an unauthorized user (e.g., a non-authorized user, a user not associated with an authorized user, etc.), a device (e.g., a television, a radio, a computing device, etc.), or the like, the threshold may be high and/or raised.

The user device 101 may determine whether audio content is associated with an authorized user or an unauthorized user. An authorized user may include a person registered to operate the user device 101 (e.g., based on a user profile, etc.), a person that has permission to use the user device 101, a user associated with the user device 101, and/or the like. An unauthorized user may include a person that is not registered to operate the user device 101 (e.g., based on a user profile, etc.), a person that does not have permission to use the user device 101, a user that is associated with the user device 101, a person that is not associated with an authorized user, and/or the like, such as a guest in a home where the user device 101 may be located, a device (e.g., a television, a radio, a computing device, etc.) generating audio content, and/or the like.

To determine whether audio content (e.g., speech, etc.) originates from an authorized user, the audio analysis module 103 may generate a voiceprint (e.g., one or more measurable characteristics of a human voice that uniquely identifies an individual, etc.) from the audio content. The audio analysis module 103 may determine audio characteristics of the audio content. Audio characteristics may be and/or include a frequency, a duration, a decibel level, an amplitude, a tone, an inflection, an audio rate, an audio volume, and/or any such characteristic associated with the audio content. The voiceprint may be a collection and/or combination of the audio characteristics. The audio analysis module 103 may determine and store (e.g., via storage module 104) audio characteristics. The audio analysis module 103 may determine and store audio characteristics when the user device 101 is configured for a "learn" or "discovery" mode, during an initial setup and/or registration of the user device 101, based on repeated use of the user device 101, combinations thereof, and the like. The user device 101 may associate a voiceprint with a particular user and/or store/associate the voiceprint with a profile (e.g., user profile).

The audio analysis module 103 may compare a voiceprint determined from audio content to a stored voiceprint known to originate from an authorized user. When a voiceprint matches and/or corresponds to a stored voiceprint, the audio analysis module 103 may determine that audio content associated with the voiceprint originates from an authorized user. The user device 101 may determine that a voiceprint does not correspond (match) to a stored voiceprint. A voiceprint that does not correspond (match) to a stored voiceprint may be associated with an unauthorized user.

The audio analysis module 103, based on determining that the audio content originates from an authorized user, may lower the threshold (e.g., the wake word detection threshold, etc.) used to determine whether the wake word (or wake phrase) (e.g. stored wake word/phrase, etc.) was detected. The audio analysis module 103, based on determining that the audio content originates from an unauthorized user, may raise the threshold used to determine whether the wake word (or wake phrase) (e.g. stored wake word/phrase, etc.) was detected.

A low threshold (e.g., wake word detection threshold, etc.) may cause the user device 101 to interact with a user (e.g., detect and/or process user commands and/or operational instructions, etc.) if the audio content includes either a wake word (or wake phrase) (e.g., matches a stored wake word/phrase, etc.), or one or more words that are similar to the wake word (or wake phrase) (e.g., similar to a stored wake word/phrase, etc.). The user device 101 may, based on the audio analysis module 103 determining that audio content is associated with an authorized user, interact with a user (e.g., detect and/or process user commands and/or operational instructions, etc.) if the audio content includes a wake word (or wake phrase), such as, "hey device." The user device 101 may, based on the audio analysis module 103 determining that audio content is associated with an authorized user, interact with the authorized user (e.g., detect and/or process user commands and/or operational instructions, etc.) if the audio content includes one or more words that are similar to the wake word (or wake phrase) "hey device," such as, "hey, devices are usually sold here," "hey, Diana," "having divided," and/or any other one or more words that may be ambiguously associated with the wake word (or wake phrase).

A high threshold (e.g., wake word detection threshold, etc.) may cause the user device 101 to interact with a user (e.g., detect and/or process user commands and/or operational instructions, etc.) only if audio content includes a wake word (or wake phrase). The user device 101 may, based on the audio analysis module 103 determining that audio content is not associated with an authorized user, such as an audio content associated with an unauthorized user (e.g., a non-authorized user, a user not associated with an authorized user, etc.), a device (e.g., a television, a radio, a computing device, etc.), or the like, may require that the audio content include a wake word (or wake phrase) prior to interacting with a user. The user device 101 may, based on the audio analysis module 103 determining that the audio content is not associated with an authorized user, require that the audio content include a wake word (or wake phrase), such as "hey device," prior to interacting with a user. The user device 101 may not interact with a user, and/or remain in an unawakened state (e.g., standby, hibernate, etc.), based on the audio analysis module 103 determining that audio content is not associated with an authorized user. A high threshold may cause the user device 101 to not interact with a user, and/or remain in an unawakened state (e.g., standby, hibernate, etc.), even if audio content includes a wake word (or wake phrase). The user device 101, by raising and lowering the threshold (e.g., the wake word detection threshold, etc.) based on whether audio content originates from an authorized user, may decrease or increase scrutiny applied to wake word detection.

The user device 101 may have a communication module 105 for providing an interface to a user to interact with the user device 102 and/or the computing device 106. The communication module 105 may be any interface for presenting and/or receiving information to/from the user, such as user feedback. An interface may be communication interface such as a web browser (e.g., Internet Explorer®, Mozilla Firefox®, Google Chrome®, Safari®, or the like). Other software, hardware, and/or interfaces may be used to provide communication between the user and one or more of the user device 101 and the computing device 106. The communication module 105 may request or query various files from a local source and/or a remote source. The communication module 105 may transmit data, such as audio content, voice characteristics, voiceprint information, and the like to a local or remote device such as the computing device 106.

The computing device 106 may be a server for communicating with the user device 101. The computing device 106 may communicate with the user device 101 for providing data and/or services. The computing device 106 may provide services, such as wake word determination services, network (e.g., Internet) connectivity, network printing, media management (e.g., media server), content services, streaming services, broadband services, or other network-related services. The computing device 106 may allow the user device 101 to interact with remote resources such as data, devices, and files. The computing device 106 may be configured as (or disposed at) a central location (e.g., a headend, or processing facility), which may receive content (e.g., audio content, wake word determination content, voiceprint information, user profiles, data, input programming, etc.) from multiple sources. The computing device 106 may combine the content from the multiple sources and may distribute the content to user (e.g., subscriber) locations via a distribution system (e.g., the network 105, etc.).

The computing device 106 may manage the communication between the user device 101 and a database 114 for sending and receiving data therebetween. The database 114 may store a plurality of files (e.g., audio content, wake word determination content, voiceprint information, user profiles, etc.), user identifiers or records, or other information. The user device 101 may request and/or retrieve a file from the database 114. The database 114 may store information relating to the user device 101 such as user information (e.g., authorized user information, unauthorized user information, etc.), wake word information, the address element 110 and/or the service element 112. The computing device 106 may obtain the device identifier 108 from the user device 101 and retrieve information from the database 114 such as user information (e.g., authorized user information, unauthorized user information, etc.), wake word information, the address element 110, and/or the service element 112. The computing device 106 may obtain the address element 110 from the user device 101 and may retrieve the service element 112 from the database 114, or vice versa. Any information may be stored in and retrieved from the database 114. The database 114 may be disposed remotely from the computing device 106 and accessed via direct or indirect connection. The database 114 may be integrated with the computing system 106 or some other device or system.

The user device 101 may communicate with the computing system 106 to determine if audio content includes a wake word (or wake phrase) and/or whether the audio content is associated with an authorized user or an unauthorized user (e.g., a non-authorized user, a user not associated with an authorized user, etc.). The user device 101 may communicate with the computing system 106 while not interacting with a user (e.g., while in standby, while hibernating, etc.). The audio content detection module 102 may detect and/or receive audio content based on a user speaking in proximity to the user device 101 and/or the like. The user device 101 may use the communication module 105 to communicate with the computing system 106 to determine if audio content includes a wake word (or wake phrase) and/or whether the audio content is associated with an authorized user or an unauthorized user. The user device 101 may provide the audio content to the computing device 106. The communication module 105 may comprise a transceiver configured for communicating information using any suitable wireless protocol, such as Wi-Fi (IEEE 802.11), BLUETOOTH®, cellular, satellite, infrared, or any other suitable wireless standard. The communication module 105 may communicate with the computing device 106 via a short-range communication technique (e.g., BLUETOOTH®, near-field communication, infrared, and the like). The communication module 105 may communicate with the computing device 106 via a long-range communication technique (e.g., Internet, cellular, satellite, and the like).

The computing device 106 may include an audio analysis module 123. The computing device 106 may use the audio analysis module 123 to determine a wake word (or wake phrase) from the audio content received from the user device 101. The audio analysis module 123 may determine one or more words that are similar to the wake word (or wake phrase). The audio analysis module 123 may determine whether a word and/or words extracted/determined from audio content match a stored wake word (or wake phrase), or are related to a stored wake word (or wake phrase). The audio analysis module 123 may assign a confidence score indicative of the accuracy of a possible wake word (or wake phrase) determined from audio content. A confidence score may be based on a scale, such as from a value of one (1) to ten (10), where scale values correspond to an accuracy of wake word detection. A confidence score may be based on any scale and/or value. The audio analysis module 123 may determine that audio content includes a one or more words, such as "hey device," that match a stored wake word (or wake phrase) "hey device," associated with the user device 101. The audio analysis module 123 may assign a confidence score of ten (10) which indicates that the wake word (or wake phrase) determined from the audio content matches (e.g., approximately 100 percent accuracy, etc.) a stored wake word. The audio analysis module 123 may determine that audio content includes one or more words that are similar to a wake word (or wake phrase) "hey device," such as, "hey, devices are usually sold here," "hey, Diana," "having divided," and/or any other one or more words that may be ambiguously associated with a stored wake word (or wake phrase), such as "hey device," associated with the user device 101. The audio analysis module 123 may assign a confidence score of eight (8) to one or more words that are similar to the stored wake word (or wake phrase) "hey device," such as, "hey, devices are usually sold here," which indicates that the one or more words determined from the audio content are close to (e.g., similar, a partial match, less than a percent of accuracy, etc.) the stored wake word. The audio analysis module 123 may assign a confidence score of two (2) to one or more words that are similar to the stored wake word (or wake phrase) "hey device," such as, "hey, do you want tacos tonight," which indicates that the one or more words determined from the audio content are weakly related (e.g., somewhat similar, a partial match, less than percent accuracy, etc.) to the stored wake word. The audio analysis module 123 may assign any confidence score indicative of the accuracy of a possible wake word (or wake phrase) determined from audio content.

The audio analysis module 123 may compare a confidence score to a threshold (e.g., a wake word detection threshold, etc.) to determine whether to accept one or more words included with audio content as a wake word or not. The audio analysis module 123 may determine to accept the one or more words included with the audio content as the wake word (or wake phrase) when the confidence score is equal to and/or satisfies the threshold, and may determine not to accept the one or more words as the wake word (or wake phrase) when the confidence score does not satisfy the threshold. The threshold may be satisfied by a confidence score that is equal to, or greater than, the threshold value. A confidence score that is less than the threshold value may not satisfy the threshold. The audio analysis module 103 may modify the threshold based on whether the audio content originates from an authorized user.

The audio analysis module 123 may modify the threshold based on whether the audio analysis module 123 determines that the audio content originates from an authorized user. When audio content originates from an authorized user, the threshold may be low and/or lowered. When audio content does not originate from an authorized user, such as audio content that originates from an unauthorized user (e.g., a non-authorized user, a user not associated with an authorized user, etc.), a device (e.g., a television, a radio, a computing device, etc.), or the like, the threshold may be high and/or raised.

The computing device 106 may determine whether audio content is associated with an authorized user or an unauthorized user. An authorized user may include a person registered to operate the user device 101 (e.g., based on a user profile, etc.), a person that has permission to use the user device 101, a user associated with the user device 101, and/or the like. An unauthorized user may include a person that is not registered to operate the user device 101 (e.g., based on a user profile, etc.), a person that does not have permission to use the user device 101, a user that is associated with the user device 101, a person not associated with an authorized user, and/or the like, such as a guest in a home where the user device 101 may be located, a device (e.g., a television, a radio, a computing device, etc.) generating audio content, and/or the like.

To determine whether audio content (e.g., speech, etc.) originates from an authorized user, the audio analysis module 123 may generate, based on the audio content (e.g., speech, etc.) a voiceprint (e.g., one or more measurable characteristics of a human voice that uniquely identifies an individual, etc.). The audio analysis module 123 may determine audio characteristics of the audio content. Audio characteristics may be and/or include a frequency, a duration, a decibel level, an amplitude, a tone, an inflection, an audio rate, an audio volume, and/or any such characteristic associated with the audio content. The voiceprint may be a collection and/or combination of the audio characteristics. The audio analysis module 123 may determine and store (e.g., via the database 114, etc.) audio characteristics. The audio analysis module 123 may receive audio content from the user device 101 and determine and store audio characteristics when the user device 101 is configured for a "learn" or "discovery" mode, during an initial setup and/or registration of the user device 101, based to repeated use of the user device 101, combinations thereof, and the like. The computing device 106 may associate a voiceprint with a particular user and/or store/associate the voiceprint with a profile (e.g., user profile).

The audio analysis module 123 may compare a voiceprint determined from audio content to a stored voiceprint known to originate from an authorized user. When a voiceprint matches and/or corresponds to a stored voiceprint, the audio analysis module 123 may determine that audio content associated with the voiceprint originates from an authorized user. The computing device 106 may determine that a voiceprint does not correspond (match) to a stored voiceprint. A voiceprint that does not correspond (match) to a stored voiceprint may be associated with an unauthorized user.

The computing device 106, based on determining that audio content is associated with an authorized user or an unauthorized user, may lower or raise a threshold (e.g., the wake word detection threshold, etc.) used to determine whether the wake word (or wake phrase) (e.g. stored wake word/phrase, etc.) was detected. A low threshold may cause the computing device 106 to instruct user device 101 to interact with a user (e.g., detect and/or process user commands and/or operational instructions, etc.) if the audio content includes either a wake word (or wake phrase) (e.g., matches a stored wake word/phrase, etc.), or one or more words that are similar to the wake word (or wake phrase) (e.g., similar to a stored wake word/phrase, etc.). A low threshold may cause the computing device 106 to instruct user device 101 to interact with a user when audio content is associated with a confidence score that is equal to, or satisfies, a threshold (e.g., wake word detection threshold, etc.) value that is low on a threshold value scale, such as a value of two (2) on a scale from one (1) to ten (10).

A high threshold (e.g., wake word detection threshold, etc.) may cause the computing device 106 to instruct user device 101 to interact with a user (e.g., detect and/or process user commands and/or operational instructions, etc.) only if audio content includes a wake word (or wake phrase). A high threshold may cause the computing device 106 to instruct user device 101 to interact with a user when audio content is associated with a confidence score that is equal to, or satisfies, a threshold (e.g., wake word detection threshold, etc.) value that is high on a threshold value scale, such as a value of nine (9) on a scale from one (1) to ten (10).

The computing device 106 may instruct user device 101, based on determining that audio content originates from an unauthorized/unknown user, to require that audio content include a wake word (or wake phrase), such as a stored wake word (or wake phrase), prior to interacting with the unauthorized user. The user device 101, based on instructions from the computing device 106, may not interact with a user, and/or remain in an unawakened state (e.g., standby, hibernate, etc.) when audio content is not associated with an authorized user. A high threshold may cause the computing device 106 to instruct the user device 101 to not interact with a user, and/or remain in an unawakened state (e.g., standby, hibernate, etc.), even if audio content includes a wake word (or wake phrase). The computing device 106, by raising and lowering the threshold (e.g., the wake word detection threshold, etc.) based on whether audio content originates from an authorized user, may decrease or increase scrutiny applied to wake word detection.

The computing device 106 may provide an indication to the user device 101 that audio content is associated with an authorized user and/or an unauthorized user. The computing device 106 may provide an indication to the user device 101 that the audio content includes (or does not include) a wake word (or wake phrase) and/or one or more words that are similar to the wake word (or wake phrase). An indication provided the user device 101 that audio content originates from an authorized user or an unauthorized user may also include a confidence score associated with one or more words determined from the audio content that indicates an accuracy of the detection of a wake word associated with the audio content.

The computing device 106 may provide an indication to the user device 101 that audio content is associated with an authorized user and/or an unauthorized user, and/or whether the audio content includes (or does not include) a wake word (or wake phrase) and/or one or more words that are similar to the wake word (or wake phrase), via the network 105. The computing device 106 may provide an indication to the user device 101 that audio content is associated with an authorized user and/or an unauthorized user, and/or whether the audio content includes (or does not include) a wake word (or wake phrase) and/or one or more words that are similar to the wake word (or wake phrase) via a short-range communication technique (e.g., BLUETOOTH®, near-field communication, infrared, and the like). The computing device 106 may provide an indication to the user device 101 that audio content is associated with an authorized user and/or an unauthorized user, and/or whether the audio content includes (or does not include) a wake word (or wake phrase) and/or one or more words that are similar to the wake word (or wake phrase), via a long-range communication technique (e.g., Internet, cellular, satellite, and the like).

The user device 101, based on an indication received from the computing device 106 that audio content is associated with an authorized user or an unauthorized user may lower or raise the threshold (e.g., the wake word detection threshold, etc.) used to determine whether the wake word (or wake phrase) (e.g. stored wake word/phrase, etc.) was detected. A low threshold may cause the user device 101 to interact with a user (e.g., detect and/or process user commands and/or operational instructions, etc.) if the audio content includes either a wake word (or wake phrase) (e.g., matches a stored wake word/phrase, etc.), or one or more words that are similar to the wake word (or wake phrase) (e.g., similar to a stored wake word/phrase, etc.). A low threshold may cause the user device 101 to interact with a user when audio content is associated with a confidence score that is equal to, or satisfies, a threshold (e.g., wake word detection threshold, etc.) value that is low on a threshold value scale, such as a value of two (2) on a scale from one (1) to ten (10).

A high threshold (e.g., wake word detection threshold, etc.) may cause the user device 101 to interact with a user (e.g., detect and/or process user commands and/or operational instructions, etc.) only if audio content includes a wake word (or wake phrase). A high threshold may cause the user device 101 to interact with a user when audio content is associated with a confidence score that is equal to, or satisfies, a threshold (e.g., wake word detection threshold, etc.) value that is high on a threshold value scale, such as a value of nine (9) on a scale from one (1) to ten (10).

The user device 101 may, based on an indication from the computing device 106 that audio content originates from an unauthorized/unknown user may require that audio content include a wake word (or wake phrase), such as a stored wake word (or wake phrase), prior to interacting with the unauthorized user. The user device 101 may not interact with a user, and/or remain in an unawakened state (e.g., standby, hibernate, etc.), based on the audio analysis module 103 determining that audio content is not associated with an authorized user. A high threshold may cause the user device 101 to not interact with a user, and/or remain in an unawakened state (e.g., standby, hibernate, etc.), even if audio content includes a wake word (or wake phrase). The user device 101, by raising and lowering the threshold (e.g., the wake word detection threshold, etc.) based on whether audio content originates from an authorized user, may decrease or increase scrutiny applied to wake word detection.

Figure 2:
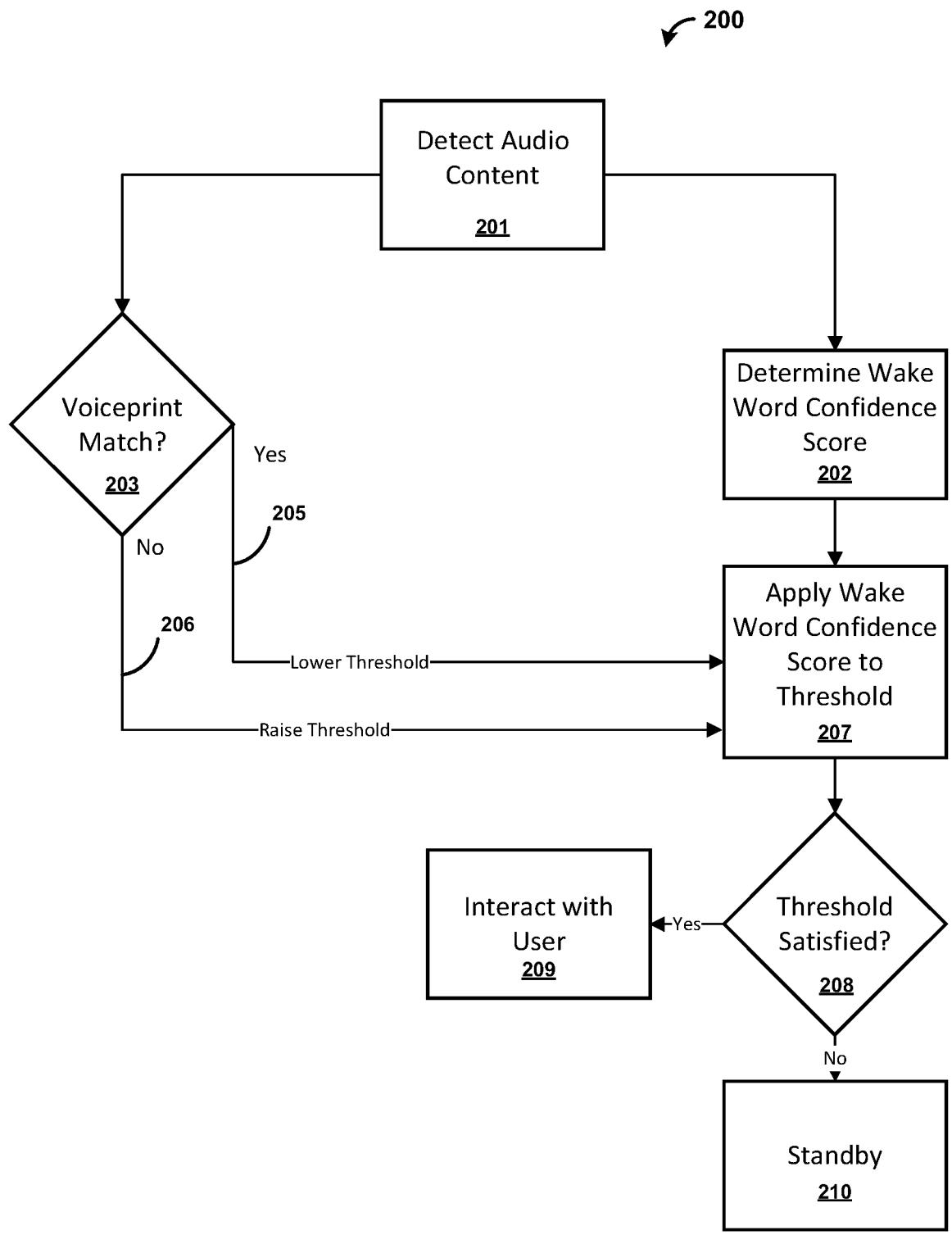
FIG. 2 shows a process for determining a wake word.

FIG. 2 shows a process 200 for determining a wake word. At 201, a user device (e.g., voice assistant device, voice enabled device, smart device, computing device, the user device 101, etc.) may detect and/or receive audio content (e.g., speech, etc.). The user device may detect and/or receive the audio content based on a user (or users) speaking in proximity to the user device, a device (e.g., a television, a radio, a computing device, etc.) in proximity to the user device, and/or any other audio content source in proximity to the user device. The user device may include one or more microphones, or the like, that detect/receive the audio content. The audio content may/may not include a wake word (or wake phrase) and/or may include one or more words that are similar to the wake word (or wake phrase). The audio content may include a wake word (or wake phrase) such as, "hey device," and/or include one or more words that are similar to the wake word (or wake phrase), such as, "Hey, devices are usually sold here."

The user device may determine whether the audio content (e.g., speech, etc.) includes the wake word (or wake phrase) and/or includes one or more words that are similar to the wake word (or wake phrase) by performing speech-to-text operations and/or applying one or more voice recognition algorithms to the audio content to extract text, such as a word and/or words. The user device may compare the text (e.g., the extracted word and/or words, etc.) to a stored text (e.g., a stored word and/or stored words, etc.), such as (e.g., a wake word (or wake phrase). The user device may access a storage that includes the wake word (or wake phrase) and/or one or more words that are similar to the wake word (or wake phrase), synonyms of the wake word (or wake phrase), words that share a phonetic relationship with the wake word (or wake phrase), and the like to determine whether the wake word is detected from the audio content.

At 202, the user device may assign a confidence score indicative of the accuracy of the detection of the wake word (e.g., did the user device detect the actual wake word/phrase, a different/similar word/phrase, background noise, etc.). A confidence score may be based on a scale, such as from a value of one (1) to ten (10), where scale values correspond to an accuracy of wake word detection. A confidence score may be based on any scale and/or value. The user device may determine that the audio content includes one or more words, such as "hey device," that match a stored wake word (or wake phrase) "hey device." The user device may assign a confidence score of ten (10) to the one or more words determined from the audio content. The confidence score of ten (10) may indicate that the one or more words match (e.g., substantially correspond, approximately 100 percent accuracy, etc.) the stored wake word. One or more words that are similar to the stored wake word (or wake phrase) such as, "hey, devices are usually sold here," may be assigned a confidence score of eight (8). The confidence score of eight (8) may indicate that the one or more words determined from the audio content are close (e.g., similar, a partial match, less than percent accuracy, etc.) to the stored wake word (or wake phrase). One or more words that are similar to the stored wake word (or wake phrase) such as, "hey, do you want tacos tonight," may be assigned a confidence score of two (2). The confidence score of two (2) may indicate that the one or more words are weakly related (e.g., somewhat similar, a partial match, less than percent accuracy, etc.) to the stored wake word. The user device may assign any confidence score indicative of the accuracy of detection of the wake word (e.g., determining one or more words that match/correspond to a stored wake word, etc.).

At 203, the user device may determine whether the audio content (e.g., speech, etc.) originates from an authorized user or an unauthorized user. Block 202 and block 203 may be performed in any order, including in parallel. An authorized user may include a person registered to operate the user device (e.g., based on stored user information, a user profile, etc.), a person that has permission to use the user device, a user associated with the user device, and/or the like. An unauthorized user may include an unknown user, a device (e.g., a television, a radio, a computing device, etc.), a person not associated with an authorized user, and/or the like. The user device may determine whether the audio content originates from an authorized user or an unauthorized user by generating, based on the audio content, a voiceprint (e.g., one or more measurable characteristics of a human voice that uniquely identifies an individual, etc.) and determining whether the voiceprint matches a stored voiceprint.

To generate the voiceprint, the user device may determine audio characteristics of the audio content. Audio characteristics may be and/or include a frequency, a duration, a decibel level, an amplitude, a tone, an inflection, an audio rate, an audio volume, and/or any such characteristic associated with the audio content. The voiceprint may be a collection and/or combination of the audio characteristics. The user device may determine and store audio characteristics as a voiceprint. The user device may determine and store voiceprints when the user device is configured for a "learn" or "discovery" mode, during an initial setup and/or registration of the user device, based to repeated use of the user device, combinations thereof, and the like.

Stored voiceprints may be associated with user profiles, such as profiles of authorized users. The user device may compare the voiceprint determined from the audio content to a stored voiceprint associated with an authorized user. When a voiceprint matches and/or corresponds to a stored voiceprint, the user device may determine that audio content associated with the voiceprint originates from an authorized user. When a voiceprint does not match and/or correspond to a stored voiceprint, the user device may determine that the voiceprint may be associated with an unauthorized user.

The user device, based on whether the user device recognizes the audio content as originating from an authorized user or an unauthorized user, may modify a threshold (e.g., the wake word detection threshold, etc.). At 205, the threshold may be low and/or lowered if the audio content originates an authorized user. At 206, the threshold may be high and/or raised if the audio content originates from an unauthorized user, such as an unknown user, a device (e.g., a television, a radio, a computing device, etc.), and/or the like.

At 207, the user device may compare and/or apply the confidence score associated with the audio content (e.g., speech, etc.), that is determined at 202, to the threshold (e.g., the wake word detection threshold, etc.). The user device may compare and/or apply the confidence score to the threshold to determine whether to accept one or more words included in the audio content as the wake word (e.g., the stored wake word, etc.) or not.

At 208, the user device may determine to accept the one or more words included with the audio content as the wake word (or wake phrase) if the confidence score is equal to and/or satisfies the threshold. The user device may determine not to accept the one or more words as the wake word (or wake phrase) if the confidence score does not satisfy the threshold. The threshold may be a value, such as a threshold value of six (6). If the audio content is associated with a confidence score of ten (10), such as one or more words that match (e.g., substantially correspond, approximately 100 percent accuracy, etc.) the stored wake word, then the user device may or may not accept the one or more words as the wake word. If the audio content is associated with a confidence score of eight (8), such as one or more words determined from the audio content are close (e.g., similar, a partial match, less than percent accuracy, etc.) to the stored wake word (or wake phrase), then the user device may or may not accept the one or more words as the wake word. If the audio content is associated with a confidence score of two (2), such as are weakly related (e.g., somewhat similar, a partial match, less than percent accuracy, etc.) to the stored wake word, then the user device may or may not accept the one or more words as the wake word. The user device may or may not accept the one or more words as the wake word based on any correlation between a confidence score and the threshold (e.g., the wake word detection threshold, etc.). The user device, may raise and lower the threshold and/or determine which confidence score values do or do not satisfy the threshold to decrease or increase scrutiny applied to wake word detection.

At 209 if the threshold is satisfied the user device may interact with the user.

At 210, if the threshold is not satisfied, the user device may not interact with the unauthorized user, and/or may remain in an unawakened state (e.g., standby, hibernate, etc.). The high and/or raised threshold may cause the user device to not interact with the user, and/or remain in an unawakened state (e.g., standby, hibernate, etc.), even if the audio content includes the wake word (or wake phrase).

Figure 3:
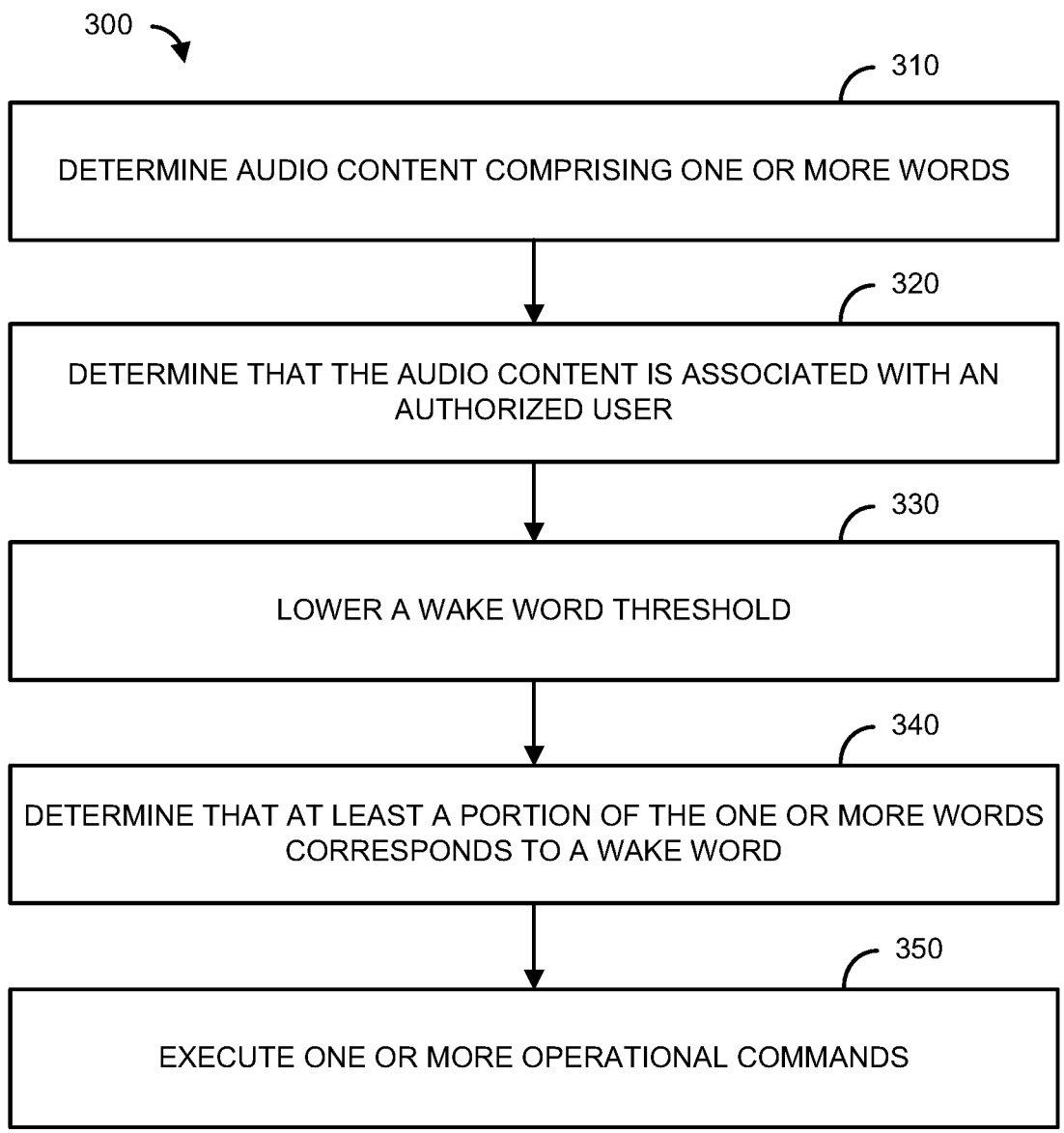
FIG. 3 shows a flowchart of a method for determining a wake word.

FIG. 3 shows a flowchart of a method 300 for determining a wake word. At 310, it may be determined that that audio content comprises one or more words. A user device (e.g., voice assistant device, voice enabled device, smart device, computing device, the user device 101, etc.) may determine that the audio content comprises the one or more words. The user device may have one or more microphones, or the like, that detect/receive the audio content. The user device may detect and/or receive the audio content based on a user speaking in proximity to the user device, a device (e.g., a television, a radio, a computing device, etc.) generating the audio content, and/or the like. The user device may determine the one or more words (e.g., a wake word, a wake phrase, etc.) by performing speech-to-text operations and/or applying one or more voice recognition algorithms to the audio content to extract the one or more words.

The one or more words may be a wake word or may be associated with a wake word (or wake phrase), such as "hey device." The one or more words may be similar to the wake word (or wake phrase), such as, "Hey, devices are usually sold here." Words that are similar to the wake word (or wake phrase) may be synonyms of the wake word (or wake phrase), words that share a phonetic relationship with the wake word (or wake phrase), and the like. The wake word (or wake phrase) may be any word and/or words.

At 320, the audio content may be determined to be associated with an authorized user. The user device may determine that the audio content is associated with an authorized user. An authorized user may include a person registered to operate the user device (e.g., based on a user profile, etc.), a person that has permission to use the user device, a user associated with the user device, and/or the like. To determine that the audio content is associated with an authorized user, the user device may determine a voiceprint based on the audio content and compare the determined voiceprint to one or more stored voiceprints (e.g., stored voiceprints of authorized users). The user device may determine that the determined voiceprint is associated with an authorized user because the determined voiceprint corresponds (matches) to a stored voiceprint that is associated with an authorized user and/or user profile. The user device may aggregate one or more voice characteristics associated with the audio content, and the aggregated voice characteristics may represent the voiceprint. Voice characteristics may be and/or include a frequency, a duration, a decibel level, an amplitude, a tone, an inflection, an audio rate, an audio volume, and/or any or such characteristic associated with the audio content.

At 330, a threshold (e.g., wake word detection threshold, etc.) may be lowered. The user device may lower the threshold. The user device may lower the threshold based on the determination that the audio content is associated with an authorized user. The threshold may be a value, such as a threshold value of six (6). The threshold may be lowered to a lesser value, such as a threshold value of one (1), because the audio content is associated with the authorized user. A low threshold may cause the user device to interact with a user (e.g., detect and/or process user commands and/or operational instructions, etc.) if audio content includes a wake word (or wake phrase) (e.g., matches a stored wake word/phrase, etc.), or includes one or more words that are similar to the wake word (or wake phrase) (e.g., similar to a stored wake word/phrase, etc.).

At 340, it may be determined that at least a portion of the one or more words corresponds to a wake word (or wake phrase). The user device may determine that at least a portion of the one or more words corresponds to the wake word (or wake phrase) by assigning a confidence score to the one or more words that is indicative of a correlation to the wake word (or wake phrase). A confidence score may be based on a scale, such as from a value of one (1) to ten (10), where the scale values correspond to a degree of correlation between the one or more words and the wake word (or wake phrase). A confidence score may be based on any scale and/or value. The user device may assign a confidence score of ten (10) to the one or more words if they include words such as "hey device," that match the wake word (or wake phrase) "hey device." The user device may assign a confidence score of two (2) to the one or more words if they include words such as "hey, do you want tacos tonight," because a portion of the one or more words (e.g., "hey, do . . . ) are weakly related (e.g., somewhat similar, a partial match, less than percent accuracy, etc.) to the wake word (or wake phrase) "hey device." The user device may assign any confidence score to the one or more words that is indicative of the correlation to the wake word (or wake phrase).

The user device may compare and/or apply the confidence score associated with the one or more words to the threshold (e.g., wake word detection threshold, etc.) to determine and/or as indication that at least a portion of the one or more words corresponds to the wake word (or wake phrase). The user device may compare and/or apply the confidence score associated with the one or more words to the threshold to determine whether to accept at least the portion of the one or more words as the wake word (e.g., the stored wake word, etc.) or not (e.g., determine how much does the portion of the one or more words match the wake word/phrase, etc.).

The user device, based on the lowered threshold, may determine that at least the portion of the one or more words corresponds to the wake word (or wake phrase). The user device may determine to accept at least the portion of the one or more words as the wake word (or wake phrase) if the confidence score satisfies the threshold. The user device may accept at least the portion of the one or more words "hey, do you want tacos tonight," that are assigned the confidence score of two (2), as the wake word (or wake phrase) because the confidence score of two (2) is greater than the lowered threshold value of one (1) (e.g., the confidence score satisfies the threshold).

At 350, one or more operational commands may be executed. The user device may execute the one or more operational commands. The user device may execute the one or more operational commands based on the determination that at least the portion of the one or more words corresponds to the wake word (or wake phrase). The user device may interact with a user to detect and execute user commands and/or operational instructions. The user commands and/or operational instructions may originate from the authorized user. The user commands and/or operational instructions may be used to control and/or manage operations associated with the user device and/or a device associated with the user device, such as a target device. Executing the one or more operational commands may include sending the one or more operational commands to a target device that executes the one or more operational commands.

Figure 4:
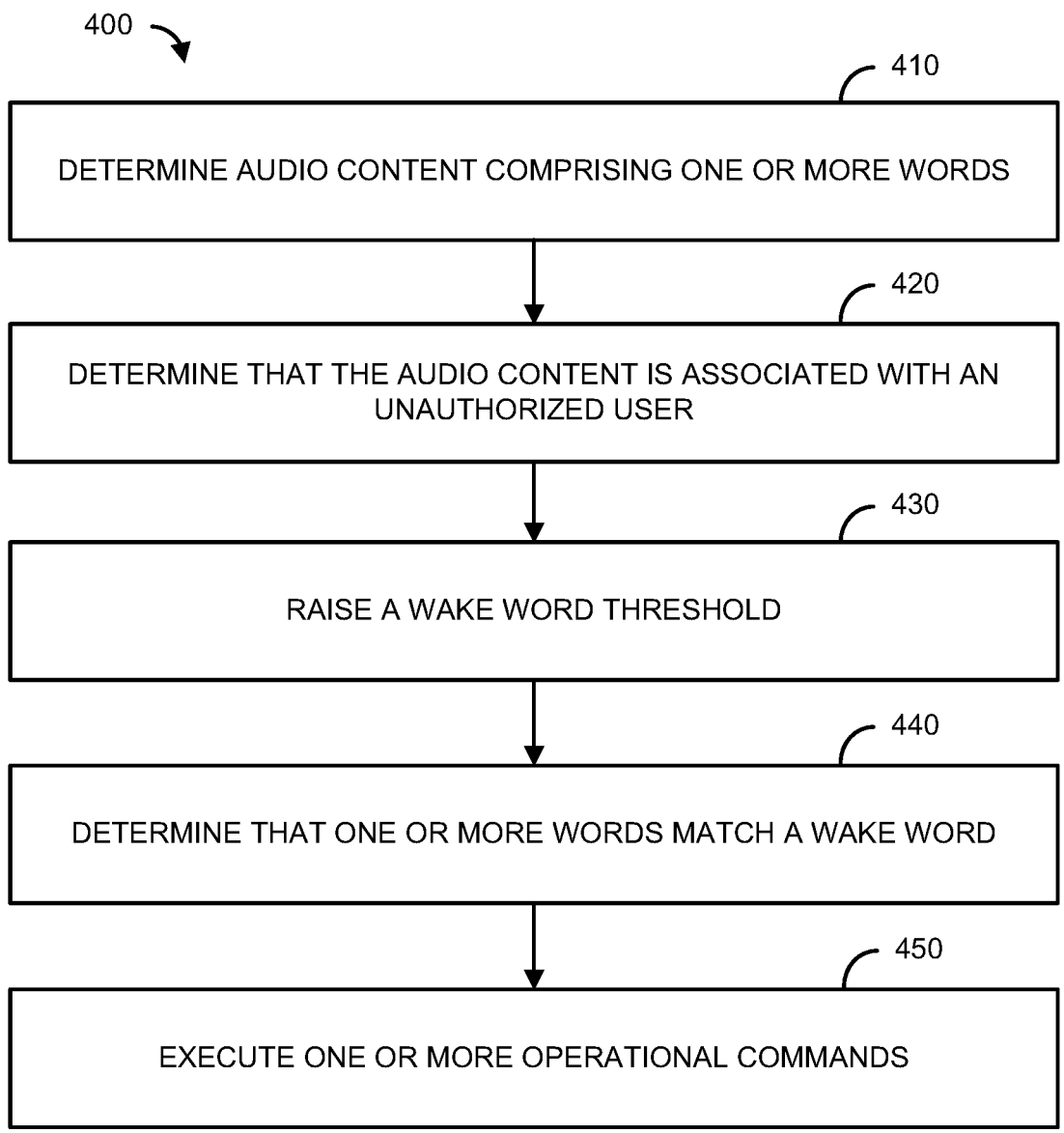
FIG. 4 shows a flowchart of a method for determining a wake word.

FIG. 4 shows a flowchart of a method 400 for determining a wake word. At 410, it may be determined that that audio content comprises one or more words. A user device (e.g., voice assistant device, voice enabled device, smart device, computing device, the user device 101, etc.) may determine that the audio content comprises the one or more words. The user device may have one or more microphones, or the like, that detect/receive the audio content. The user device may detect and/or receive the audio content based on a user speaking in proximity to the user device, a device (e.g., a television, a radio, a computing device, etc.) generating the audio content, and/or the like. The user device may determine the one or more words (e.g., a wake word, a wake phrase, etc.) by performing speech-to-text operations and/or applying one or more voice recognition algorithms to the audio content to extract the one or more words.

The one or more words may be or be associated with a wake word (or wake phrase), such as "hey device." The one or more words may be similar to the wake word (or wake phrase), such as, "Hey, devices are usually sold here." Words that are similar to the wake word (or wake phrase) may be synonyms of the wake word (or wake phrase), words that share a phonetic relationship with the wake word (or wake phrase), and the like. The wake word (or wake phrase) may be any word and/or words.

At 420, the audio content may be determined to be associated with an unauthorized user (e.g., a non-authorized user, a user not associated with an authorized user, a device, etc.). The user device may determine that the audio content is associated with an unauthorized user. An unauthorized user may include a person that is not registered to operate the user device (e.g., based on a user profile, etc.), a person that does not have permission to use the user device, a user that is not associated with the user device, and/or the like, such as a guest in a home where the user device may be located, a device (e.g., a television, a radio, a computing device, etc.) generating audio content, and/or the like. To determine that the audio content is associated with an unauthorized user, the user device may determine a voiceprint based on the audio content and compare the determined voiceprint to one or more stored voiceprints (e.g., stored voiceprints of authorized users.). The user device may determine that the determined voiceprint is not associated with an authorized user because the determined voiceprint does not correspond (match) to a stored voiceprint that is associated with an authorized user and/or user profile. The user device may aggregate one or more voice characteristics associated with the audio content, and the aggregated voice characteristics may represent the voiceprint. Voice characteristics may be and/or include a frequency, a duration, a decibel level, an amplitude, a tone, an inflection, an audio rate, an audio volume, and/or any or such characteristic associated with the audio content.

At 430, a threshold (e.g., wake word detection threshold, etc.) may be raised. The user device may raise the threshold (e.g., wake word detection threshold, etc.). The user device may raise the wake word threshold based on the determination that the audio content is associated with an unauthorized user. The threshold may be a value, such as a threshold value of five (5). The threshold may be raised to a higher value, such as a threshold value of seven (7), because the audio content is associated with the unauthorized user. A high (or raised) threshold (e.g., wake word detection threshold, etc.) may cause the user device to interact with an unauthorized user (e.g., detect and/or process user commands and/or operational instructions, etc.) only if the audio content includes the wake word (or wake phrase) or a word/phrase that substantially matches/corresponds to the wake word (or wake phrase).

At 440, it may be determined that at least a portion of the one or more words corresponds to a wake word (or wake phrase). The user device may determine that at least a portion of the one or more words corresponds to the wake word (or wake phrase) by assigning a confidence score to the one or more words that is indicative of a correlation to the wake word (or wake phrase). A confidence score may be based on a scale, such as from a value of one (1) to ten (10), where the scale values correspond to a degree of correlation between the one or more words and the wake word (or wake phrase). A confidence score may be based on any scale and/or value. The user device may assign a confidence score of ten (10) to the one or more words if they include words such as "hey device," that match the wake word (or wake phrase) "hey device." The user device may assign a confidence score of eight (8) to the one or more words if they include words such as "hey, devices are usually sold here," because a portion of the one or more words (e.g., "hey devices) closely match (e.g., similar, a partial match, less than percent accuracy, etc.) the wake word (or wake phrase) "hey device." The user device may assign any confidence score to the one or more words that is indicative of the correlation to the wake word (or wake phrase).

The user device may compare and/or apply the confidence score associated with the one or more words to the threshold (e.g., wake word detection threshold, etc.) to determine and/or as indication that at least a portion of the one or more words corresponds to the wake word (or wake phrase). The user device may compare and/or apply the confidence score associated with the one or more words to the threshold to determine whether to accept at least the portion of the one or more words as the wake word (e.g., the stored wake word, etc.) or not (e.g., determine how much does the portion of the one or more words match the wake word/phrase, etc.).

The user device, based on the raised threshold, may be required to determine that at least the portion of the one or more words match the wake word (or wake phrase). The user device may determine to accept at least the portion of the one or more words as the wake word (or wake phrase) if the confidence score satisfies the threshold. The user device may accept at least the portion of the one or more words "hey device," that are assigned the confidence score of ten (10), as the wake word (or wake phrase) because the confidence score of ten (10) is greater than the raised threshold value of seven (7) (e.g., the confidence score satisfies the threshold).

The user device may, based on the determining that the audio content is associated with an unauthorized user (e.g., a non-authorized user, a user not associated with an authorized user, etc.), require that the audio content include the wake word (or wake phrase) prior to interacting with the unauthorized user. The user device may not interact with the unauthorized user based on the determining that audio content is associated with the unauthorized user. A high (or raised) threshold may cause the user device to not interact with the unauthorized user even if the audio content includes the wake word (or wake phrase).

At 450, one or more operational commands may be executed. The user device may execute the one or more operational commands. The user device may execute the one or more operational commands based on the determination that at least the portion of the one or more words corresponds to the wake word (or wake phrase). The user device may interact with a user to detect and execute user commands and/or operational instructions. The user commands and/or operational instructions may originate from the unauthorized user. The user commands and/or operational instructions may be used to control and/or manage operations associated with the user device and/or a device associated with the user device, such as a target device. Executing the one or more operational commands may include sending the one or more operational commands to a target device that executes the one or more operational commands.

Figure 5:
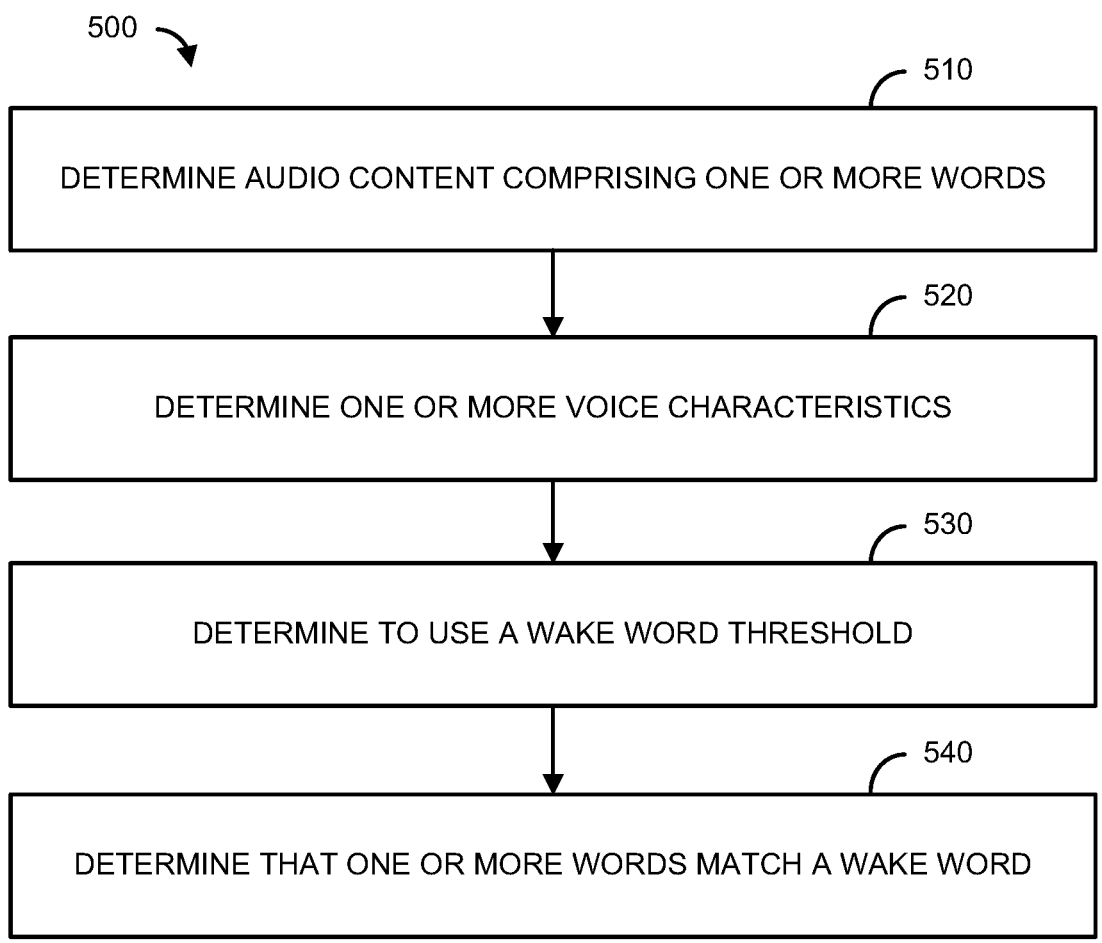
FIG. 5 shows a flowchart of a method for determining a wake word.

FIG. 5 shows a flowchart of a method 500 for determining a wake word. At 510, it may be determined that that audio content comprises one or more words. A user device (e.g., voice assistant device, voice enabled device, smart device, computing device, the user device 101, etc.) may determine that the audio content comprises the one or more words. The user device may have one or more microphones, or the like, that detect/receive the audio content. The user device may detect and/or receive the audio content based on a user speaking in proximity to the user device, a device (e.g., a television, a radio, a computing device, etc.) generating the audio content, and/or the like. The user device may determine the one or more words (e.g., a wake word, a wake phrase, etc.) by performing speech-to-text operations and/or applying one or more voice recognition algorithms to the audio content to extract the one or more words.

The one or more words may be a wake word or may be associated with a wake word (or wake phrase), such as "hey device." The one or more words may be similar to the wake word (or wake phrase), such as, "Hey, devices are usually sold here." Words that are similar to the wake word (or wake phrase) may be synonyms of the wake word (or wake phrase), words that share a phonetic relationship with the wake word (or wake phrase), and the like. The wake word (or wake phrase) may be any word and/or words.

At 520, one or more voice characteristics associated with the audio content may be determined. The one or more voice characteristics associated with the audio content may be indicative of whether the audio content is associated with an authorized user or an unauthorized user. An authorized user may include a person registered to operate the user device (e.g., based on a user profile, etc.), a person that has permission to use the user device, a user associated with the user device, and/or the like. An unauthorized user may include a person that is not registered to operate the user device (e.g., based on a user profile, etc.), a person that does not have permission to use the user device, a user that is not associated with the user device and/or an authorized user, and/or the like, such as a guest in a home where the user device may be located, a device (e.g., a television, a radio, a computing device, etc.) generating audio content, and/or the like.

At 530, a threshold (e.g., wake word detection threshold, etc.) may be determined. The user device may determine to use the threshold based on the one or more voice characteristics associated with the audio content. The user device may user the one or more voice characteristics associated with the audio content to determine a voiceprint. The user device may aggregate the one or more voice characteristics associated with the audio content, and the aggregated voice characteristics may represent the voiceprint. Voice characteristics may be and/or include a frequency, a duration, a decibel level, an amplitude, a tone, an inflection, an audio rate, an audio volume, and/or any or such characteristic associated with the audio content.

The user device may compare the determined voiceprint to one or more stored voiceprints (e.g., stored voiceprints of authorized users). The user device may determine that the determined voiceprint is associated with an authorized user when the determined voiceprint corresponds (matches) to a stored voiceprint that is associated with an authorized user and/or user profile. The user device may determine that the determined voiceprint is not associated with an authorized user when the determined voiceprint does not correspond (match) to a stored voiceprint that is associated with an authorized user and/or user profile.

The user device may lower the threshold. The user device may lower the threshold based on the one or more voice characteristic indicating that the audio content is associated with an authorized user. The threshold may be a value, such as a threshold value of six (6). The threshold may be lowered to a lesser value, such as a threshold value of one (1), because the audio content is associated with the authorized user. A low threshold may cause the user device to interact with a user (e.g., detect and/or process user commands and/or operational instructions, etc.) if audio content includes a wake word (or wake phrase) (e.g., matches a stored wake word/phrase, etc.), or includes one or more words that are similar to the wake word (or wake phrase) (e.g., similar to a stored wake word/phrase, etc.).

The user device may raise the threshold (e.g., wake word detection threshold, etc.). The user device may raise the wake word threshold based on the determination that the audio content is associated with an unauthorized user. The threshold may be a value, such as a threshold value of five (5). The threshold may be raised to a higher value, such as a threshold value of seven (7), because the audio content is associated with the unauthorized user. A high (or raised) threshold (e.g., wake word detection threshold, etc.) may cause the user device to interact with an unauthorized user (e.g., detect and/or process user commands and/or operational instructions, etc.) only if the audio content includes the wake word (or wake phrase) or a word/phrase that substantially matches/corresponds to the wake word (or wake phrase).

At 540, it may be determined that at least a portion of the one or more words corresponds to a wake word (or wake phrase). The user device may determine that at least a portion of the one or more words corresponds to the wake word (or wake phrase) by assigning a confidence score to the one or more words that is indicative of a correlation to the wake word (or wake phrase). A confidence score may be based on a scale, such as from a value of one (1) to ten (10), where the scale values correspond to a degree of correlation between the one or more words and the wake word (or wake phrase). A confidence score may be based on any scale and/or value. The user device may assign a confidence score of ten (10) to the one or more words if they include words such as "hey device," that match the wake word (or wake phrase) "hey device." The user device may assign a confidence score of eight (8) to the one or more words if they include words such as "hey, devices are usually sold here," because a portion of the one or more words (e.g., "hey devices) closely match (e.g., similar, a partial match, less than percent accuracy, etc.) the wake word (or wake phrase) "hey device." The user device may assign a confidence score of two (2) to the one or more words if they include words such as "hey, do you want tacos tonight," because a portion of the one or more words (e.g., "hey, do . . . ) are weakly related (e.g., somewhat similar, a partial match, less than percent accuracy, etc.) to the wake word (or wake phrase) "hey device." The user device may assign any confidence score to the one or more words that is indicative of the correlation to the wake word (or wake phrase).

The user device may compare and/or apply the confidence score associated with the one or more words to the threshold (e.g., wake word detection threshold, etc.) to determine and/or as indication that at least a portion of the one or more words corresponds to the wake word (or wake phrase). The user device may compare and/or apply the confidence score associated with the one or more words to the threshold to determine whether to accept at least the portion of the one or more words as the wake word (e.g., the stored wake word, etc.) or not (e.g., determine how much does the portion of the one or more words match the wake word/phrase, etc.).

The user device, based on a lowered threshold, may determine that at least the portion of the one or more words corresponds to the wake word (or wake phrase). The user device may determine to accept at least the portion of the one or more words as the wake word (or wake phrase) if the confidence score satisfies the threshold. The user device may accept at least the portion of the one or more words "hey, do you want tacos tonight," that are assigned the confidence score of two (2), as the wake word (or wake phrase) because the confidence score of two (2) is greater than the lowered threshold value of one (1) (e.g., the confidence score satisfies the threshold).

The user device, based on a raised threshold, may be required to determine that at least the portion of the one or more words match the wake word (or wake phrase). The user device may determine to accept at least the portion of the one or more words as the wake word (or wake phrase) if the confidence score satisfies the threshold. The user device may accept at least the portion of the one or more words "hey device," that are assigned the confidence score of ten (10), as the wake word (or wake phrase) because the confidence score of ten (10) is greater than the raised threshold value of seven (7) (e.g., the confidence score satisfies the threshold).

The user device, based on the one or more voice characteristic indicating that that the audio content is associated with an unauthorized user (e.g., a non-authorized user, a user not associated with an authorized user, etc.), may require that the audio content include the wake word (or wake phrase) prior to interacting with the unauthorized user. The user device may not interact with the unauthorized user based on the determining that audio content is associated with the unauthorized user. A high (or raised) threshold may cause the user device to not interact with the unauthorized user even if the audio content includes the wake word (or wake phrase).

One or more operational commands may be executed. The user device may execute the one or more operational commands. The user device may execute the one or more operational commands based on the determination that at least the portion of the one or more words corresponds to the wake word (or wake phrase). The user device may interact with a user to detect and execute user commands and/or operational instructions. The user commands and/or operational instructions may originate from an authorized user or an unauthorized user. The user commands and/or operational instructions may be used to control and/or manage operations associated with the user device and/or a device associated with the user device, such as a target device. Executing the one or more operational commands may include sending the one or more operational commands to a target device that executes the one or more operational commands.

Figure 6:
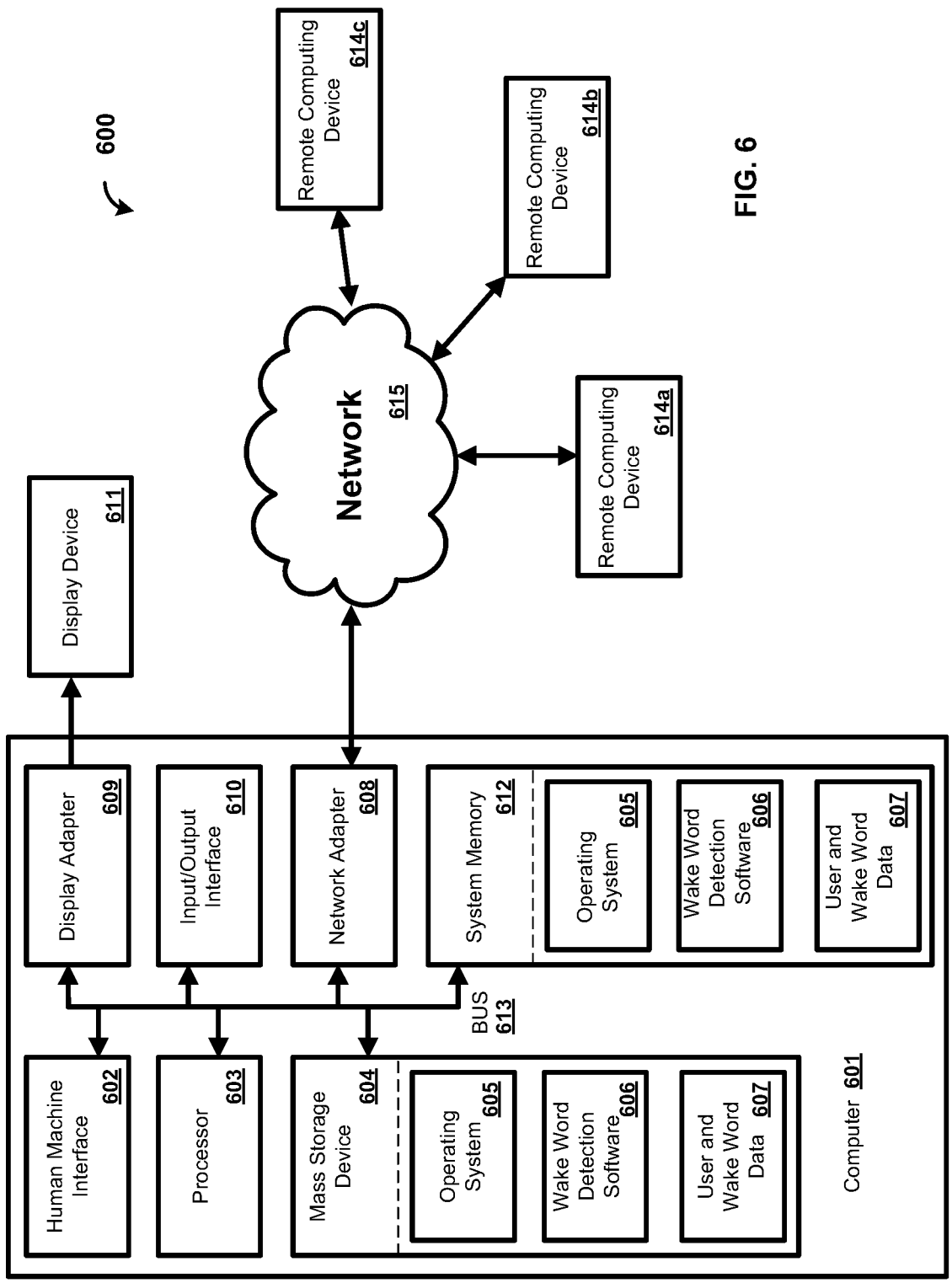
FIG. 6 shows a block diagram of a computing device for implementing wake word determination.

FIG. 6 shows a system 600 for determining a wake word. The user device 101, and the computing device 106 of FIG. 1 may be a computer 601 as shown in FIG. 6. The computer 601 may comprise one or more processors 603, a system memory 612, and a bus 613 that couples various components of the computer 601 including the one or more processors 603 to the system memory 612. In the case of multiple processors 603, the computer 601 may utilize parallel computing.

The bus 613 may comprise one or more of several possible types of bus structures, such as a memory bus, memory controller, a peripheral bus, an accelerated graphics port, and a processor or local bus using any of a variety of bus architectures.

The computer 601 may operate on and/or comprise a variety of computer readable media (e.g., non-transitory). Computer readable media may be any available media that is accessible by the computer 601 and comprises, non-transitory, volatile and/or non-volatile media, removable and non-removable media. The system memory 612 has computer readable media in the form of volatile memory, such as random access memory (RAM), and/or non-volatile memory, such as read only memory (ROM). The system memory 612 may store data such as user and wake word data 607 and/or program modules such as operating system 605 and wake word detection software 606 that are accessible to and/or are operated on by the one or more processors 603.

The computer 601 may also comprise other removable/non-removable, volatile/non-volatile computer storage media. The mass storage device 604 may provide non-volatile storage of computer code, computer readable instructions, data structures, program modules, and other data for the computer 601. The mass storage device 604 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules may be stored on the mass storage device 604. An operating system 605 and wake word detection software 606 may be stored on the mass storage device 604. One or more of the operating system 605 and wake word detection software 606 (or some combination thereof) may comprise program modules and the user and wake word software 606. User and wake word data 607 may also be stored on the mass storage device 604. User and wake word data 607 may be stored in any of one or more databases known in the art. The databases may be centralized or distributed across multiple locations within the network 615.

A user may enter commands and information into the computer 601 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 603 via a human machine interface 602 that is coupled to the bus 613, but may be connected by other interface and bus structures, such as a parallel port, game port, an IEEE 1394 Port (also known as a Firewire port), a serial port, network adapter 608, and/or a universal serial bus (USB).

A display device 611 may also be connected to the bus 613 via an interface, such as a display adapter 609. It is contemplated that the computer 601 may have more than one display adapter 609 and the computer 601 may have more than one display device 611. A display device 611 may be a monitor, an LCD (Liquid Crystal Display), light emitting diode (LED) display, television, smart lens, smart glass, and/or a projector. In addition to the display device 611, other output peripheral devices may comprise components such as speakers (not shown) and a printer (not shown) which may be connected to the computer 601 via Input/Output Interface 610. Any step and/or result of the methods may be output (or caused to be output) in any form to an output device. Such output may be any form of visual representation, including, but not limited to, textual, graphical, animation, audio, tactile, and the like. The display 611 and computer 601 may be part of one device, or separate devices.

The computer 601 may operate in a networked environment using logical connections to one or more remote computing devices 614a,b,c. A remote computing device 614a,b,c may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device or other common network node, and so on. Logical connections between the computer 601 and a remote computing device 614a,b,c may be made via a network 615, such as a local area network (LAN) and/or a general wide area network (WAN). Such network connections may be through a network adapter 608. A network adapter 608 may be implemented in both wired and wireless environments. Such networking environments are conventional and commonplace in dwellings, offices, enterprise-wide computer networks, intranets, and the Internet.

Application programs and other executable program components such as the operating system 605 are shown herein as discrete blocks, although it is recognized that such programs and components may reside at various times in different storage components of the computing device 601, and are executed by the one or more processors 603 of the computer 601. An implementation of wake word detection software 606 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   determining, by a user device, that audio content comprises one or more words;

determining, based on one or more voice characteristics associated with the audio content, that the audio content is associated with an authorized user;

determining, based on the audio content being associated with the authorized user, to use a low wake word threshold;

determining, based on the low wake word threshold, that at least a portion of the one or more words correspond to a wake word or phrase; and executing, based on determining that the at least the portion of the one or more words correspond to the wake word or phrase, one or more operational commands associated with the audio content.

2. The method of claim 1, wherein the low wake word threshold is associated with one or more authorized users and a high wake word threshold is associated with an origin of the audio content that is not the one or more authorized users, wherein the high wake word threshold is higher than the low wake word threshold.

3. The method of claim 1, wherein determining that the audio content is associated with the authorized user comprises:

determining, based on the one or more voice characteristics, a voiceprint; and determining that the voiceprint corresponds to a stored voiceprint, wherein the stored voiceprint is associated with the authorized user.

4. The method of claim 1, wherein determining that the audio content comprises the one or more words comprises one or more of voice recognition or natural language processing, and wherein the one or more voice characteristics comprise one or more of a frequency, a decibel level, or a tone.

5. The method of claim 1, wherein determining that at least the portion of the one or more words correspond to the wake word or phrase comprises:

determining, based on the one or more words, a confidence score indicative of a quantity of words of the one or more words that match or are associated with the wake word or phrase; and determining that the confidence score satisfies the low wake word threshold.

6. The method of claim 5, wherein the quantity of words of the one or more words that match or are associated with the wake word or phrase comprises one or more of a phonetic association with the wake word or phrase or a spelling association to the wake word or phrase.

7. The method of claim 1, wherein the one or more operational commands are associated with a target device, wherein executing the one or more operational commands comprises sending the one or more operational commands to the target device.

8. A method comprising:

determining, by a computing device, that audio content comprises one or more words;

determining, based on one or more voice characteristics associated with the audio content, that the audio content is not associated with one or more authorized users;

determining, based on determining that the audio content is not associated with the one or more authorized users, to use a high wake word threshold;

determining, based on the high wake word threshold, that at least a portion of the one or more words matches a wake word or phrase; and executing, based on determining that the at least the portion of the one or more words matches the wake word or phrase, one or more operational commands associated with the audio content.

9. The method of claim 8, wherein determining that the audio content comprises the one or more words comprises one or more of voice recognition or natural language processing.

10. The method of claim 8, wherein determining that the audio content is not associated with the one or more authorized users comprises:

determining, based on the one or more voice characteristics, a voiceprint; and determining that the voiceprint does not correspond to a stored voiceprint, wherein the stored voiceprint is associated with one or more of the one or more authorized users.

11. The method of claim 10, wherein the stored voiceprint is stored based on one or more of a mode of a user device, an initial configuration of the user device, or a repeat use of the user device.

12. The method of claim 8, wherein the one or more voice characteristics comprise one or more of a frequency, a decibel level, or a tone.

13. The method of claim 8, wherein determining that the at least the portion of the one or more words matches the wake word or phrase comprises determining that the at least the portion of the one or more words matches a stored wake word or phrase.

14. The method of claim 8, wherein the one or more operational commands are associated with a target device, and executing the one or more operational commands comprises sending, to the target device, the one or more operational commands.

15. The method of claim 8 further comprising:

determining that the one or more words do not match the wake word or phrase; and blocking, based on determining that the one or more words do not match the wake word or phrase, access to a user device.

16. A method comprising:

determining, by a user device, that audio content comprises one or more words;

determining one or more voice characteristics associated with the audio content, wherein at least a portion of the one or more voice characteristics associated with the audio content are indicative of whether the audio content is associated with an authorized user;

determining, based on the at least the portion of the one or more voice characteristics, a wake word threshold; and determining, based on the wake word threshold, if at least a portion of the one or more words corresponds to a wake word or phrase.

17. The method of claim 16, further comprising:

determining, based on the one or more voice characteristics indicating that the audio content is associated with one or more authorized users, to lower the wake word threshold; and determining, based on determining to lower the wake word threshold, that the at least the portion of the one or more words corresponds to the wake word or phrase.

18. The method of claim 16, further comprising:

determining, based on the one or more voice characteristics indicating that the audio content is not associated with one more authorized users, to raise the wake word threshold, wherein the determining that the at least the portion of the one or more words matches the wake word or phrase is based on the raised wake word threshold.

19. The method of claim 18, further comprising executing, based on determining that the at least the portion of the one or more words matches the wake word or phrase, one or more operational commands associated with the audio content.

20. The method of claim 1, wherein the authorized user comprises one or more of a person registered to use the user device, a person associated with a user profile, a person associated with stored user information, a person granted permission to use the user device, or a person associated with the user device.

21. The method of claim 1, wherein the low wake word threshold causes the user device to interact with a user if the audio content comprises one or more of the wake word or phrase or one or more words similar to the wake word or phrase.

22. The method of claim 2, wherein the origin of the audio content that is not the one or more authorized users comprises one or more of a person not registered to use the user device, a non-authorized person, an unauthorized person, a person not associated with a first authorized user of the one or more authorized users, a person not associated with the user device, a person not associated with a user profile, an unknown user, a television, a radio, a computing device, a device generating audio content, or an unknown source.

23. The method of claim 2, wherein the high wake word threshold causes the user device to interact with a user if the audio content comprises the wake word or phrase.

24. The method of claim 8, wherein an origin of the audio content not associated with the one or more authorized users comprises one or more of a person not registered to use a user device, a non-authorized person, an unauthorized person, a person not associated with an authorized user, a person not associated with the user device, a person not associated with a user profile, an unknown user, a television, a radio, another computing device, a device generating audio content, or an unknown source.

25. The method of claim 8, wherein the high wake word threshold causes a user device to interact with a user if the audio content comprises the wake word or phrase.

26. The method of claim 16, wherein the authorized user comprises one or more of a person registered to use the user device, a person associated with a user profile, a person associated with stored user information, a person granted permission to use the user device, or a person associated with the user device.

27. The method of claim 17, wherein the lowered wake word threshold comprises a low wake word threshold, and wherein the low wake word threshold causes the user device to interact with a user if the audio content comprises one or more of the wake word or phrase or one or more words similar to the wake word or phrase.

28. The method of claim 18, wherein an origin of the audio content not associated with the one or more authorized user comprises one or more of a person not registered to use the user device, a non-authorized person, an unauthorized person, a person not associated with a first authorized user of the one or more authorized users, a person not associated with the user device, a person not associated with a user profile, an unknown user, a television, a radio, a computing device, a device generating audio content, or an unknown source.

* * * * *